United States Patent
Viswanathan

(10) Patent No.: US 10,152,635 B2
(45) Date of Patent: Dec. 11, 2018

(54) UNSUPERVISED ONLINE LEARNING OF OVERHANGING STRUCTURE DETECTOR FOR MAP GENERATION

(71) Applicant: HERE Global B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 75 days.

(21) Appl. No.: 15/413,996

(22) Filed: Jan. 24, 2017

(65) Prior Publication Data
US 2018/0211111 A1  Jul. 26, 2018

(51) Int. Cl.
| | | |
|---|---|---|
| G06K 9/00 | (2006.01) | |
| G06N 3/08 | (2006.01) | |
| G06K 9/46 | (2006.01) | |
| G06K 9/62 | (2006.01) | |
| G06K 9/66 | (2006.01) | |
| G06T 7/60 | (2017.01) | |

(52) U.S. Cl.
CPC ..... *G06K 9/00637* (2013.01); *G06K 9/00805* (2013.01); *G06K 9/468* (2013.01); *G06K 9/6219* (2013.01); *G06K 9/6256* (2013.01); *G06K 9/66* (2013.01); *G06N 3/088* (2013.01); *G06T 7/60* (2013.01); *G06T 2207/30184* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 9,140,792 | B2 | 9/2015 | Zeng |
| 9,280,832 | B2 | 3/2016 | Cleveland et al. |
| 2005/0226522 | A1 | 10/2005 | Gallagher |
| 2011/0282578 | A1 | 11/2011 | Miksa et al. |

(Continued)

FOREIGN PATENT DOCUMENTS

| | | | |
|---|---|---|---|
| EP | 2879385 A1 | 6/2015 | |
| WO | WO 2016/079466 A1 | 5/2016 | |

OTHER PUBLICATIONS

Fleischer, K., et al., "Machine-Vision-Based Detection and Tracking of Stationary Infrastructural Objects Beside Innercity Roads", Proceedings of IEEE Intelligent Transportation Systems, Aug. 25-29, 2001, pp. 525-530, Oakland, CA.

(Continued)

*Primary Examiner* — Idowu O Osifade
(74) *Attorney, Agent, or Firm* — Alston & Bird LLP

(57) ABSTRACT

Methods, apparatuses, computer program products, and systems are provided for training a network to act as an overhanging structure detector using an unsupervised machine learning technique. An image is received that was captured by an image capturing device in communication with a probe apparatus on board a vehicle, wherein the image comprises at least a portion of a roadway. A sky projection is generated based on at least a portion of the image. It is determined whether the sky projection comprises a feature that defines a feature direction that is substantially non-vertical. Responsive to determining that the sky projection does comprise a feature that defines a feature direction that is substantially non-vertical, it is determined that the image comprises an overhanging structure.

20 Claims, 6 Drawing Sheets

(56) References Cited

U.S. PATENT DOCUMENTS

| | | | |
|---|---|---|---|
| 2015/0008294 | A1 | 1/2015 | Desbordes et al. |
| 2015/0235099 | A1 | 8/2015 | Lee et al. |
| 2015/0332114 | A1* | 11/2015 | Springer ............... G06K 9/4604 348/148 |
| 2015/0332117 | A1 | 11/2015 | Zhou et al. |
| 2016/0019419 | A1 | 1/2016 | Chen |
| 2016/0110878 | A1 | 4/2016 | Chang et al. |
| 2016/0267331 | A1 | 9/2016 | Pillai et al. |
| 2017/0336801 | A1 | 11/2017 | Shashua et al. |
| 2017/0347030 | A1 | 11/2017 | Guerreiro et al. |

OTHER PUBLICATIONS

Glenn, J., et al., "Calibration and Use of Camera-Based Systems for Road Lighting Assessment", International Journal of Lighting Research and Technology, Apr. 12, 2000, pp. 33-40, vol. 32, No. 1, Great Britain.

Fraundorfer, Friedrich, et al., "Visual Odometry Part II: Matching, Robustness, Optimization, and Applications", IEEE Robotics & Automation Magazine, Jun. 2012, pp. 78-90, vol. 19, Issue 2, IEEE, U.S.A.

Geiger, Andreas, "LIBVISO2: C++ Library for Visual Odometry 2", Jun. 30, 2013-Apr. 12, 2017, 5 pages, Internet Archive <https://web.archive.org/web/20150802230330/http://www.cvlibs.net/software/libviso/> on Apr. 25, 2017.

Grauman, Kristen, et al., "Visual Object Recognition", Synthesis Lectures on Computer Vision #1, Jan. 27, 2011, 172 pages, retrieved from <http://cs.gmu.edu/~kosecka/cs482/grauman-recognition-draft-27-01-11.pdf> on Apr. 25, 2017.

Kitt, Bernd, et al., "Visual Odometry based on Stereo Image Sequences with RANSAC-based Outlier Rejection Scheme", Proceedings of IEEE 2010 Intelligent Vehicles Symposium, Jun. 21-24, 2010, 7 pages, San Diego, California, retrieved from <http://www.cvlibs.net/publications/Kitt2010IV.pdf> on Jan. 12, 2017.

Lowry, Stephanie Margaret, "Visual Place Recognition for Persistent Robot Navigation in Changing Environments", Doctor of Philosophy Thesis, School of Electrical Engineering and Computer Science, Queensland University of Technology, 2014, 191 pages, retrieved from <http://eprints.qut.edu.au/79404/1/Stephanie_Lowry_Thesis.pdf> on Jan. 12, 2017.

Milford, Michael, et al., "Vision-based Simultaneous Localization and Mapping in Changing Outdoor Environments", Journal of Field Robotics, 2014, pp. 780-802, vol. 31, Issue 5, Wiley Periodicals, Inc., U.S.A.

Nelson, Peter, et al., "From Dusk till Dawn: Localisation at Night using Artificial Light Sources", 8 pages, Proceedings of IEEE International Conference on Robotics and Automation, May 26-30, 2015, 8 pages, Seattle, Washington, retrieved from <http://www.robots.ox.ac.uk/~mobile/Papers/2015ICRA_Nelson.pdf> on Jan. 12, 2017.

Sabattini, Lorenzo, et al., "Bird's-Eye View Image for the Localization of a Mobile Robot by Means of Trilateration", Proceedings of the IFAC Symposium on Intelligent Autonomous Vehicles, Sep. 6, 2010, 6 pages, vol. 7, Lecce, Italy, retrieved from <http://www.arscontrol.org/publications/2010-SabSecFanSte-IAV.pdf> on Jan. 12, 2017.

Scaramuzza, Davide, et al., "Visual Odometry Part I: The First 30 Years and Fundamentals", IEEE Robotics & Automation Magazine, Dec. 2011, pp. 80-92, vol. 18, Issue 4, IEEE, U.S.A.

Seo, Young-Woo, et al., "Ortho-Image Analysis for Producing Lane-Level Highway Maps" (Research Paper), Carnegie Mellon University, Sep. 2012, 29 pages, retrieved from <http://repository.cmu.edu/cgi/viewcontent.cgi?article=2085&context=robotics> on Apr. 25, 2017.

Shindler, Michael, et al., "Fast and Accurate k-means for Large Datasets", Proceedings of 25th Annual Conference on Neural Information Processing Systems, Dec. 12-14, 2011, Granada, Spain, retrieved from <http://papers.nips.cc/paper/4362-fast-and-accurate-k-means-for-large-datasets.pdf> on Apr. 25, 2017.

Van Hamme, David, et al., "Robust Visual Odometry using Uncertainty Models", Proceedings of ACIVS 2011, Aug. 22-25, 2011, 12 pages, Ghent, Belgium, retrieved from <https://biblio.ugent.be/publication/1965938/file/6763235> on Jan. 12, 2017.

Wei, Lijun, "Multi-sources fusion based vehicle localization in urban environments under a loosely coupled probabilistic framework", Doctoral Thesis, Universit'e de Technologie de Belfort-Montbeliard, Jul. 17, 2013, 187 pages, retrieved from <https://tel.archives-ouvertes.fr/tel-01004660/document> on Jan. 12, 2017.

* cited by examiner

UNSUPERVISED ONLINE LEARNING OF OVERHANGING STRUCTURE DETECTOR FOR MAP GENERATION

TECHNOLOGICAL FIELD

An example embodiment relates generally to automatic detection of structures overhanging a roadway. In particular, an example embodiment generally relates to unsupervised learning of an overhanging structure detector.

BACKGROUND

Autonomous driving requires detailed and highly accurate maps. However, generating detailed and highly accurate maps can be time consuming and labor and capital intensive. For example, the traditional approach to generating a map of highway overpass locations using global positioning system (GPS)-tagged images begins by training an image-based highway overpass detector. The training process tends to involve the tedious manual annotation of all highway overpass regions within, for example, thousands of images. Thus, before the detector can even be used, a large time, labor, and capital investment is required.

BRIEF SUMMARY

At least some example embodiments provide an unsupervised online machine learning technique for training a neural network or deep net to act as an overhanging structure detector. The overhanging structure detector may then be used to identify overhanging structures captured by probe apparatuses. A digital map may be updated based on the identified overhanging structures.

In accordance with an example embodiment, an image is received. The image was captured by an image capturing device in communication with a probe apparatus on board a vehicle. The image comprises at least a portion of a roadway. A sky projection is generated based on at least a portion of the image. It is determined whether the sky projection comprises a feature that defines a feature direction that is substantially non-vertical. Responsive to determining that the sky projection does comprise a feature that defines a feature direction that is substantially non-vertical, it is determined that the image comprises an overhanging structure.

In accordance with an example embodiment, a method is provided that comprises receiving an image captured by an image capturing device in communication with a probe apparatus on board a vehicle, wherein the image comprises at least a portion of a roadway. The method further comprises generating a sky projection based on at least a portion of the image. The method further comprises determining whether the sky projection comprises a feature that defines a feature direction that is substantially non-vertical; and, responsive to determining that the sky projection does comprise a feature that defines a feature direction that is substantially non-vertical, determining that the image comprises an overhanging structure.

In at least some example embodiments, the method further comprises, responsive to determining that the sky projection does comprise a feature that defines a feature direction that is substantially non-vertical, adding the image to a first cluster, the first cluster consisting of images comprising overhanging structures; or responsive to determining that the sky projection does not comprise a feature that defines a feature direction that is substantially non-vertical, adding the image to a second cluster, the second cluster consisting of images not comprising overhanging structures. The first cluster and second cluster represent the overhanging structure detector. In an example embodiment, the method further comprises training an overhanging structure detector using the first and second clusters, for example, using a semi-supervised machine learning technique. In an example embodiment, the method further comprises using the overhanging structure detector to identify an overhanging structure in one or more images captured by one or more probe apparatuses each onboard a vehicle. Each of the one or more images are tagged with a geolocation determined by a location sensor in communication with the corresponding probe apparatus. The method may further comprise analyzing an image of the one or more images to determine overhanging structure information corresponding to the identified overhanging structure; and updating map information based on at least one of (a) the geolocation, (b) at least a portion of the overhanging structure information, or (c) both.

In an example embodiment, the feature direction is substantially non-vertical when the feature direction satisfies a configurable and/or predefined angular threshold requirement. In an example embodiment, the feature direction is substantially non-vertical when the feature direction substantially differs from one or more roadside object directions defined by a roadside object pattern within the sky projection.

In an example embodiment, the method further comprises analyzing the image to determine overhanging structure information. In an example embodiment, the overhanging structure information comprises at least one of the height of the overhanging structure, the length of the overhanging structure, or both.

In an example embodiment, generating the sky projection from the image comprises using a homography to map pixels of the image to a top-down view. The top-down view comprises the sky projection. The pixels of at least a bottom portion of the image are not mapped to the top-down view. The bottom portion comprises at least one of a portion of a roadway, a portion of a ground, a portion of a vehicle, or a combination thereof.

In accordance with an example embodiment, an apparatus is provided that comprises at least one processor and at least one memory storing computer program code, with the at least one memory and the computer program code configured to, with the processor, cause the apparatus to at least receive an image captured by an image capturing device in communication with a probe apparatus on board a vehicle, wherein the image comprises at least a portion of a roadway. The at least one memory and the computer program code are further configured to, with the processor, cause the apparatus to at least generate a sky projection based on at least a portion of the image. The at least one memory and the computer program code are further configured to, with the processor, cause the apparatus to at least determine whether the sky projection comprises a feature that defines a feature direction that is substantially non-vertical; and, responsive to determining that the sky projection does comprise a feature that defines a feature direction that is substantially non-vertical, determine that the image comprises an overhanging structure.

In at least some example embodiments, the at least one memory and the computer program code are further configured to, with the processor, cause the apparatus to at least, responsive to determining that the sky projection does comprise a feature that defines a feature direction that is substantially non-vertical, add the image to a first cluster, the first cluster consisting of images comprising overhanging structures; or responsive to determining that the sky projection does not comprise a feature that defines a feature direction that is substantially non-vertical, and add the image to a second cluster, the second cluster consisting of images not comprising overhanging structures. The first cluster and second cluster represent an unsupervised overhanging structure detector. In an example embodiment, the at least one memory and the computer program code are further configured to, with the processor, cause the apparatus to at least train an overhanging structure detector using the first and second clusters. In an example embodiment, the at least one memory and the computer program code are further configured to, with the processor, cause the apparatus to at least use the overhanging structure detector to identify an overhanging structure in one or more images captured by one or more probe apparatuses each onboard a vehicle. Each of the one or more images are tagged with a geolocation determined by a location sensor in communication with the corresponding probe apparatus. The at least one memory and the computer program code are further configured to, with the processor, cause the apparatus to at least analyze an image of the one or more images to determine overhanging structure information corresponding to the identified overhanging structure; and updating map information based on at least one of (a) the geolocation, (b) at least a portion of the overhanging structure information, or (c) both.

In an example embodiment, the feature direction is substantially non-vertical when the feature direction satisfies a configurable and/or predefined angular threshold requirement. In an example embodiment, the feature direction is substantially non-vertical when the feature direction substantially differs from one or more roadside object directions defined by a roadside object pattern within the sky projection.

In an example embodiment, the at least one memory and the computer program code are further configured to, with the processor, cause the apparatus to at least analyze the image to determine overhanging structure information. In an example embodiment, the overhanging structure information comprises at least one of the height of the overhanging structure, the length of the overhanging structure, or both.

In an example embodiment, to generate the sky projection from the image the at least one memory and the computer program code are configured to, with the processor, cause the apparatus to at least use a homography to map pixels of the image to a top-down view. The top-down view comprises the sky projection. The pixels of at least a bottom portion of the image are not mapped to the top-down view. The bottom portion comprises at least one of a portion of a roadway, a portion of a ground, a portion of a vehicle, or a combination thereof.

In accordance with an example embodiment, a computer program product is provided that comprises at least one non-transitory computer-readable storage medium having computer-executable program code instructions stored therein with the computer-executable program code instructions comprising program code instructions configured to least receive an image captured by an image capturing device in communication with a probe apparatus on board a vehicle, wherein the image comprises at least a portion of a roadway. The computer-executable program code instructions further comprise program code instructions configured to generate a sky projection based on at least a portion of the image. The computer-executable program code instructions further comprise program code instructions configured to determine whether the sky projection comprises a feature that defines a feature direction that is substantially non-vertical. The computer-executable program code instructions further comprise program code instructions configured to, responsive to determining that the sky projection does comprise a feature that defines a feature direction that is substantially non-vertical, determine that the image comprises an overhanging structure.

In at least some example embodiments, the computer-executable program code instructions further comprise program code instructions configured to, responsive to determining that the sky projection does comprise a feature that defines a feature direction that is substantially non-vertical, add the image to a first cluster, the first cluster consisting of images comprising overhanging structures; or responsive to determining that the sky projection does not comprise a feature that defines a feature direction that is substantially non-vertical, add the image to a second cluster, the second cluster consisting of images not comprising overhanging structures. The first cluster and second cluster represent an unsupervised overhanging structure detector. In an example embodiment, the computer-executable program code instructions further comprise program code instructions configured to train an overhanging structure detector using the first and second clusters. In an example embodiment, the computer-executable program code instructions further comprise program code instructions configured to use the overhanging structure detector to identify an overhanging structure in one or more images captured by one or more probe apparatuses each onboard a vehicle. Each of the one or more images are tagged with a geolocation determined by a location sensor in communication with the corresponding probe apparatus. The computer-executable program code instructions further comprise program code instructions configured to analyze an image of the one or more images to determine overhanging structure information corresponding to the identified overhanging structure; and updating map information based on at least one of (a) the geolocation, (b) at least a portion of the overhanging structure information, or (c) both.

In an example embodiment, the feature direction is substantially non-vertical when the feature direction satisfies a configurable and/or predefined angular threshold requirement. In an example embodiment, the feature direction is substantially non-vertical when the feature direction substantially differs from one or more roadside object directions defined by a roadside object pattern within the sky projection.

In an example embodiment, the computer-executable program code instructions further comprise program code instructions configured to analyze the image to determine overhanging structure information. In an example embodiment, the overhanging structure information comprises at least one of the height of the overhanging structure, the length of the overhanging structure, or both.

In an example embodiment, to generate the sky projection from the image the computer-executable program code instructions further comprise program code instructions configured to use a homography to map pixels of the image to a top-down view. The top-down view comprises the sky projection. The pixels of at least a bottom portion of the image are not mapped to the top-down view. The bottom portion comprises at least one of a portion of a roadway, a portion of a ground, a portion of a vehicle, or a combination thereof.

In accordance with yet another example embodiment of the present invention, an apparatus is provided that comprises means for training a network to act as an automated overhanging structure detector using an unsupervised online machine learning technique. In certain embodiments, the apparatus comprises means for receiving an image captured by an image capturing device in communication with a probe apparatus on board a vehicle. The image comprises at least a portion of a roadway. The apparatus comprises means for generating a sky projection based on at least a portion of the image. The apparatus comprises means for determining whether the sky projection comprises a feature that defines a feature direction that is substantially non-vertical. The apparatus comprises means for, responsive to determining that the sky projection does comprise a feature that defines a feature direction that is substantially non-vertical, determining that the image comprises an overhanging structure.

BRIEF DESCRIPTION OF THE DRAWINGS

Figure 1:
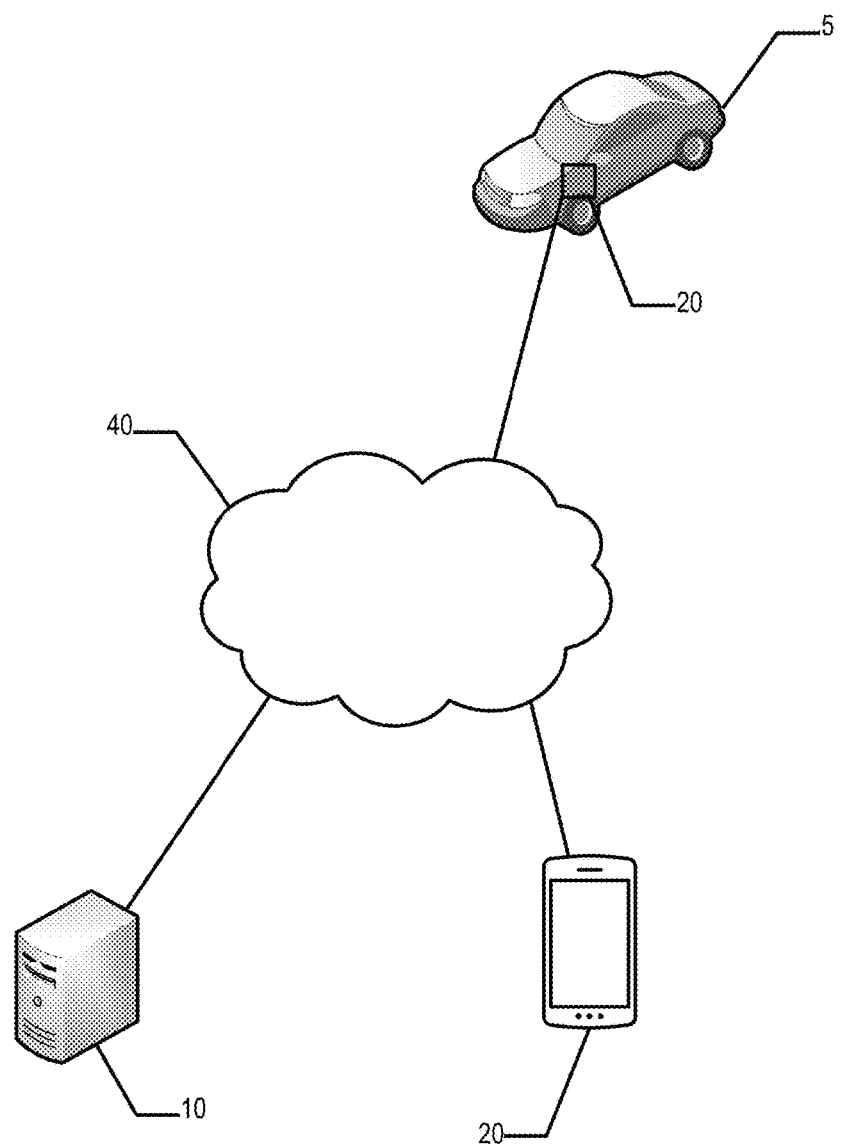
Figure 2A:
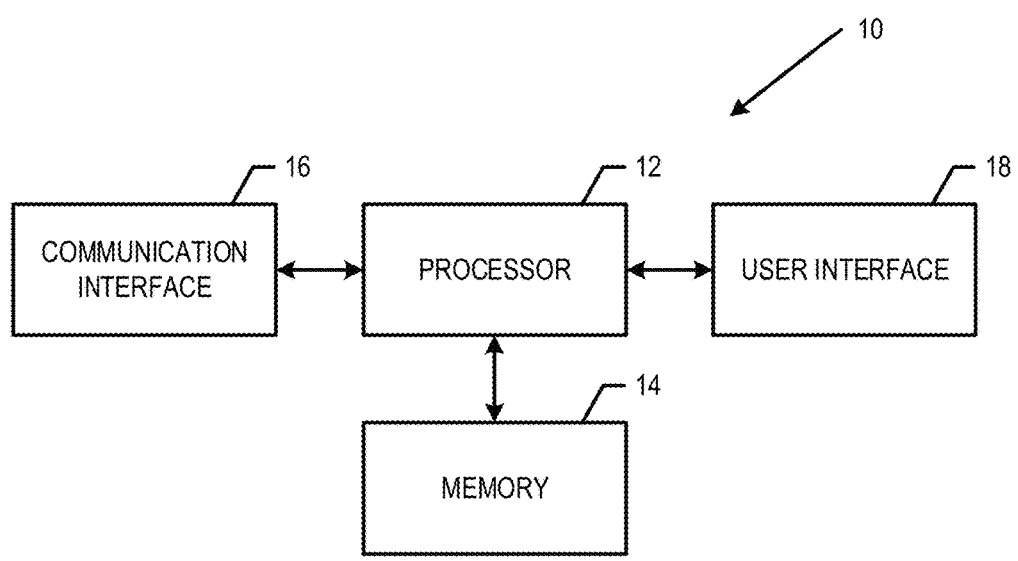
Figure 2B:
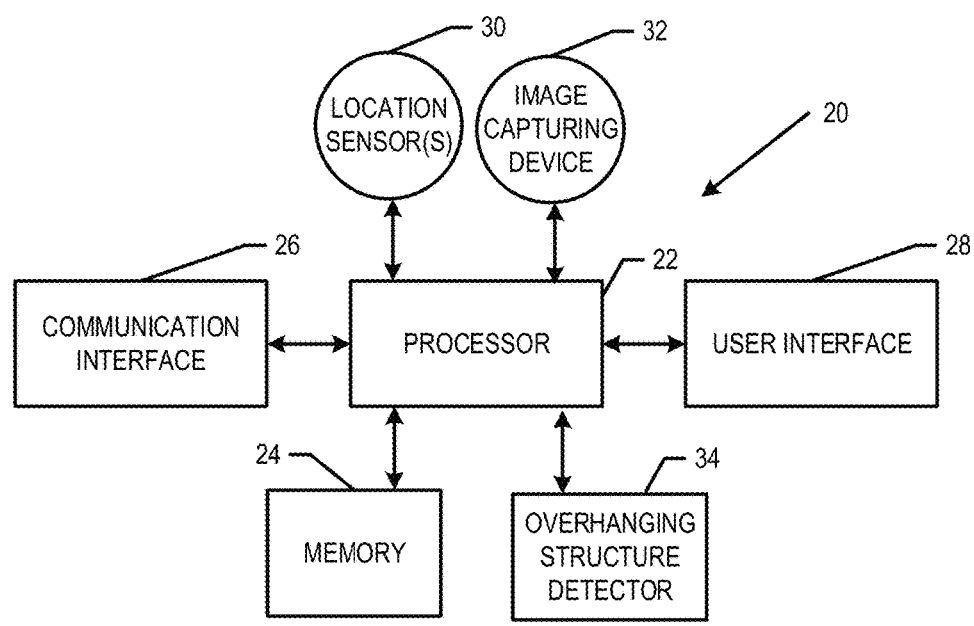
Figure 3:
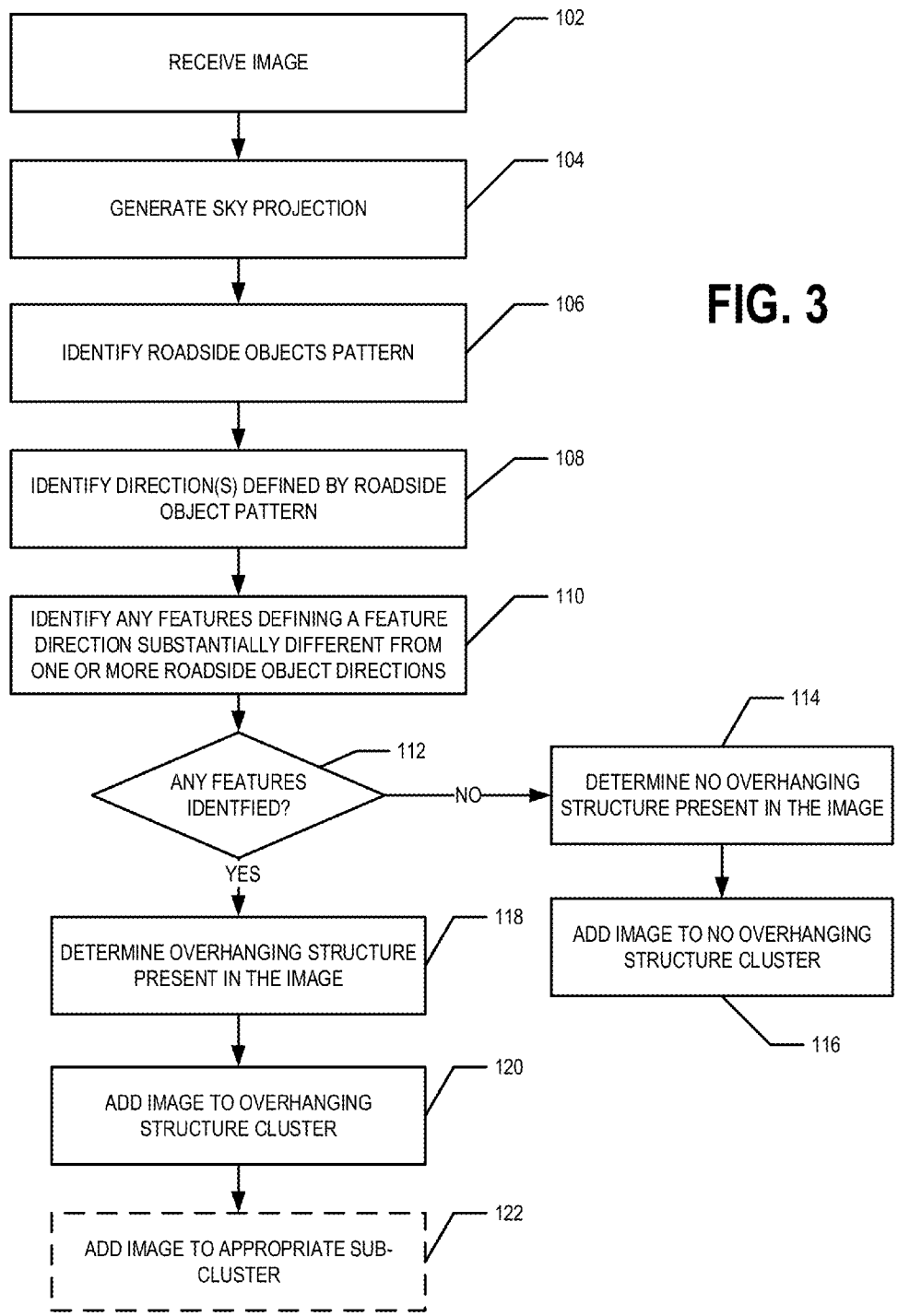
Figure 4:
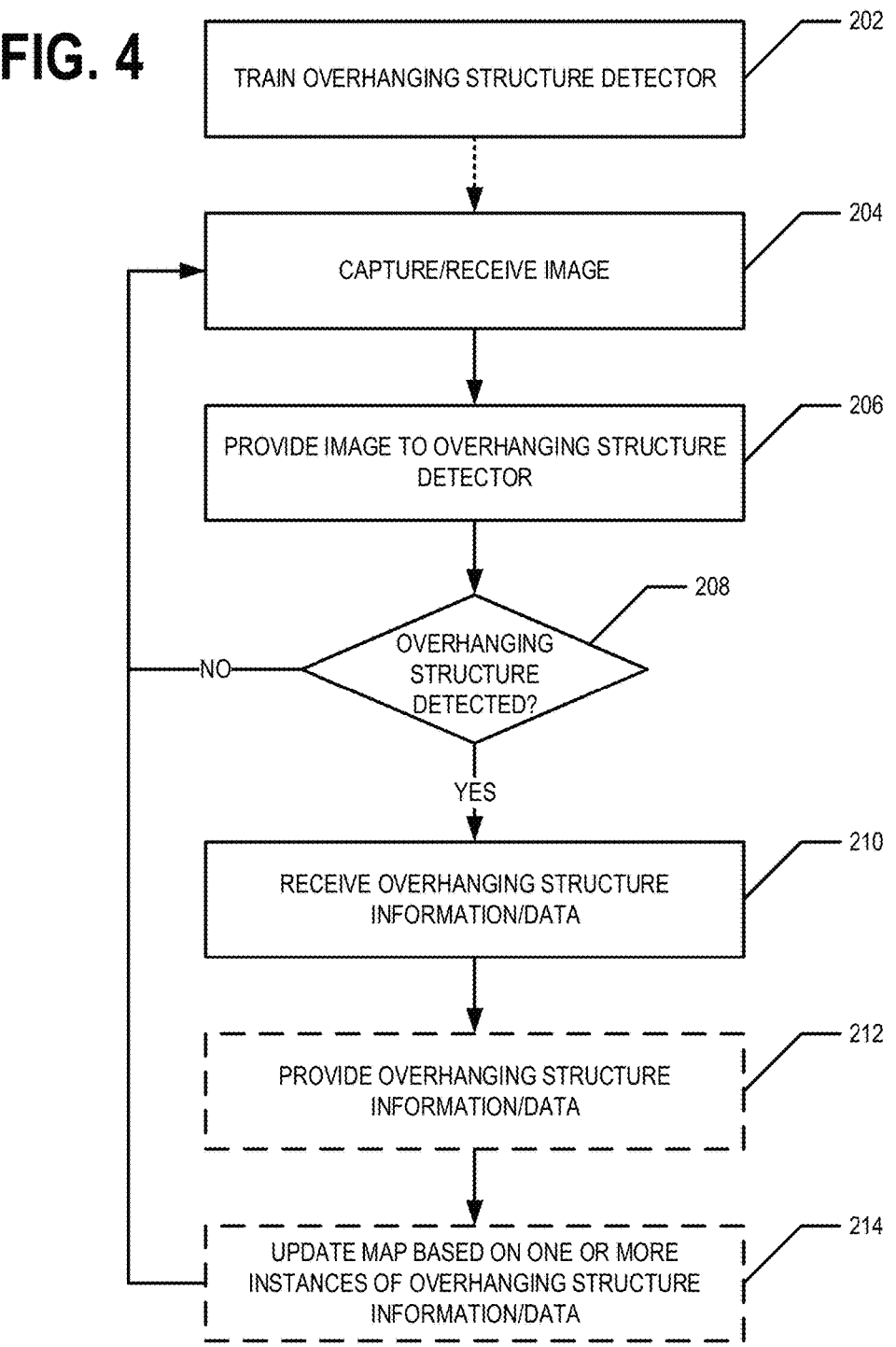
Figures 5A, 5B:
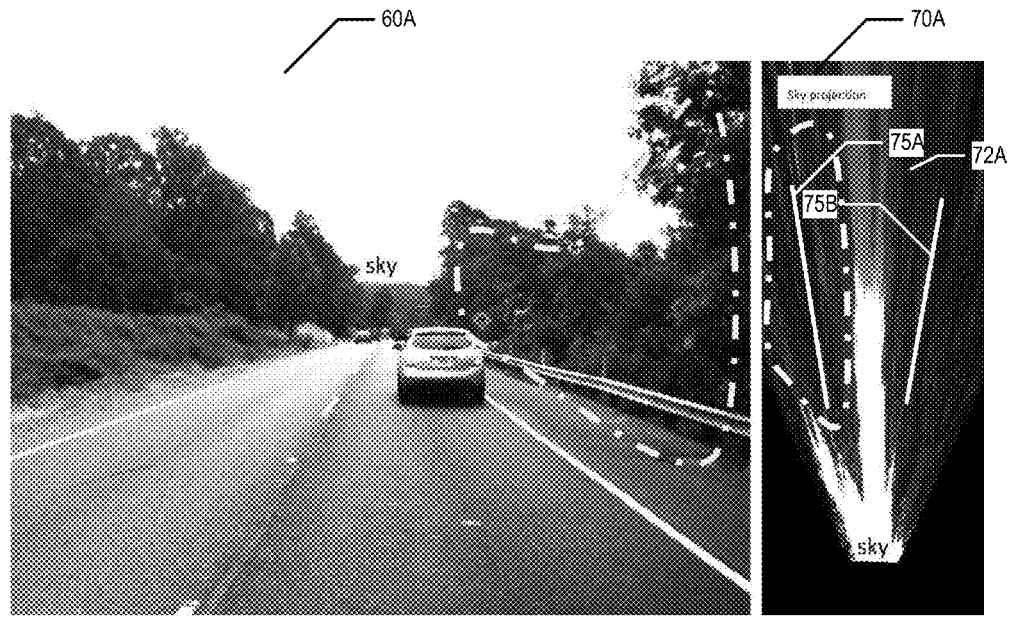
Figures 6A, 6B:
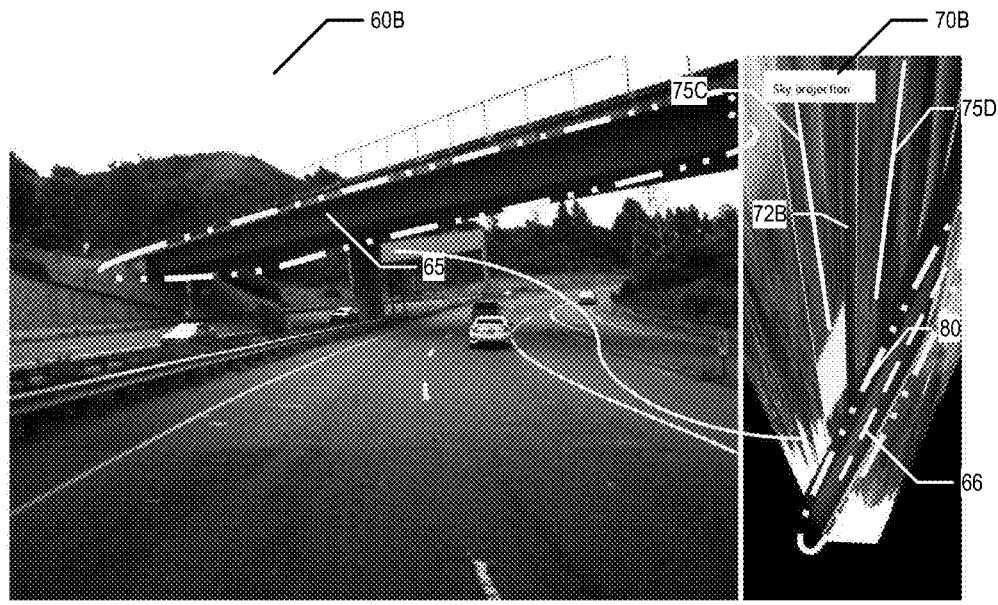

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by the apparatus of FIG. 2A or the probe apparatus of FIG. 2B to train the overhanging structure detector, in accordance with an example embodiment;

FIG. 4 is a flowchart illustrating operations performed, such as by the apparatus of FIG. 2A or the probe apparatus of FIG. 2B, in accordance with an example embodiment;

FIG. 5A is an first example image, according to an example embodiment;

FIG. 5B is an example sky projection of the first example image shown in FIG. 5A, according to an example embodiment;

FIG. 6A is a second example image, according to an example embodiment; and

FIG. 6B is an example sky projection of the second example image shown in FIG. 6A, according to an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In an example embodiment, the term "substantially" refers to being within 3% of a particular value. For example, an angle that is less than 10° from vertical may be substantially vertical and an angle that is 11° or more from vertical may not be substantially vertical, in an example embodiment. In another example embodiment, the term "substantially" refers to being within 4.5% of a particular value. For example, an angle that is less than 15° from vertical may be substantially vertical and an angle that is 17° or more from vertical may not be substantially vertical, in an example embodiment. In yet another example embodiment, the term "substantially" refers being within 5.5% of a particular value. For example, an angle that is less than 20° from vertical may be substantially vertical while an angle that is 21° or more from vertical is may not be substantially vertical, in an example embodiment. In a further example embodiment, the term "substantially" may be configurable and defined based on a particular data set. For example, an angle may be substantially vertical if the value of the angle is within no more than one standard deviation (or one and a half or two standard deviations or other predefined or configurable multiple of standard deviations) from the mean of the set of angles (assuming the set of angles is drawn from a Gaussian distribution) and an angle may be substantially non-vertical if the value of the angle is more than one standard deviation (or one and a half or two standard deviations or other predefined or configurable multiple of standard deviations) from the mean of the set of angles.

I. General Overview

Methods, apparatus, and computer program products are provided in accordance with an example embodiment in order to train an image-based overhanging structure detector using unsupervised learning techniques. Example embodiments provide methods, apparatus, and computer program products for using an overhanging structure detector for updating a map comprising overhanging structures. In an example embodiment, an overhanging structure may be any structure that at least partially overhangs a roadway. For example, an overhanging structure may be an overpass over a highway, a bridge (e.g., a pedestrian bridge, train bridge, vehicular traffic bridge, and/or the like) passing over a roadway, a tunnel that a roadway passes through, and/or the like. For example, an overhanging structure detector may be trained to identify overhanging structures in images and/or projections or mappings of images using an unsupervised machine learning technique. The trained overhanging structure detector may then be used to identify overhanging structures. For example, an overhanging structure may be identified and the location of an overhanging structure may be determined. Various overhanging structure information/data corresponding to the overhanging structure may be determined. For example, the height and/or length of the overhanging structure may be determined. A map tile of a digital map may then be updated based on the identified overhanging structure, the location of the overhanging structure, and/or the overhanging structure information/data.

FIG. 1 provides an illustration of an example system that can be used in conjunction with various embodiments of the present invention. As shown in FIG. 1, the system may include one or more probe apparatuses 20, one or more apparatuses 10, one or more networks 40, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like.

In an example embodiment, an apparatus 10 may comprise components similar to those shown in the example apparatus 10 diagrammed in FIG. 2A. In an example embodiment, the apparatus 10 is configured to train an overhanging structure detector, use the overhanging structure detector to identify overhanging structures in images captured by one or more probe apparatuses 20, generate and provide map updates, and/or the like. In an example embodiment, a probe apparatus 20 may comprise components similar to those shown in the example probe apparatus 20 diagrammed in FIG. 2B. In various embodiments, the apparatus 10 may be located remotely from the probe apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a probe apparatus 20 may be in communication with an apparatus 10 via the network 40. For example, the probe apparatus 20 may communicate with the apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the apparatus 10.

In an example embodiment, as shown in FIG. 2B, the probe apparatus 20 may comprise a processor 22, memory 24, a communications interface 26, a user interface 28, one or more location sensors 30 (e.g., a location sensor such as a global navigation satellite system (GNSS); GPS sensor; inertial measurement unit (IMU) sensors, and/or the like), one or more image capturing devices 32 (e.g., camera(s); two dimensional (2D) and/or three dimensional (3D) light detection and ranging (LiDAR)(s) sensors; long, medium, and/or short range radio detection and ranging (RADAR) sensors; ultrasonic sensors; electromagnetic sensors; (near-)infrared (IR) cameras, 3D cameras, 360° cameras and/or the like) and/or other sensors that enable the probe apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that identifies the correspondence between (a) the position of the vehicle 5 and the position of the location sensor 30, (b) the position of the location sensor 30 and the image capturing device 32, (c) the pose of the vehicle 5 and the field of view of the image capturing device 32, (d) the height of the image capturing device 32 above the ground, and/or the like. In an example embodiment, the probe apparatus 20 may further comprise an overhanging structure detector 34. For example, the overhanging structure detector 34 may be a network (e.g., a deep neural network, and/or the like) that has been trained using an unsupervised machine learning technique to identify an overhanging structure in an image. For example, the overhanging structure detector 34 may be trained to analyze an image captured by the image capturing device 32 to determine if an overhanging structure is present in the image. In example embodiments, the overhanging structure detector 34 may operate on a central processing unit (CPU) or a graphics processing unit (GPU) of the probe apparatus 20.

Similarly, as shown in FIG. 2A, the apparatus 10 may comprise a processor 12, memory 14, a user interface 18, a communications interface 16, and/or other components configured to perform various operations, procedures, functions or the like described herein. In an example embodiment, the apparatus 10 may be configured to use an unsupervised machine learning technique to train an overhanging structure detector to identify overhanging structures in an image, receive one or more images from one or more probe apparatuses 20, analyze the one or more images to identify overhanging structures therein, determine overhanging structure information/data corresponding to an identified overhanging structure, update one or more map tiles of a digital map based on the identified overhanging structure and/or the corresponding overhanging structure information/data, and/or the like. For example, an overhanging structure detector may be a network (e.g., a deep neural network, and/or the like) that is to be or has been trained using an unsupervised machine learning technique to identify an overhanging structure in an image. For example, the overhanging structure detector may operate on a CPU or GPU of the apparatus 10. Certain example embodiments of the probe apparatus 20 and the apparatus 10 are described in more detail below with respect to FIGS. 2A and 2B.

II. Example Operation

An example embodiment provides a solution to the technical problem of automatic detection of overhanging structures. For example, embodiments of the present invention may provide improvements to the time, labor, and capital investment required to train a network to automatically detect overhanging structures. In particular, an embodiment of the present invention may provide the technical advantage of being able to efficiently train a network to dynamically identify overhanging structures and determine overhanging structure information/data. For example, the overhanging structure detector may be trained by simply driving a probe apparatus 20 and/or a corresponding vehicle 5 through a region comprising overhanging structures. In another example, training the overhanging structure detector according to example embodiments of the present invention (e.g., clustering the sky projection in the appropriate feature space) requires less computing costs than traditional methods. For example, the sky projection represents simplified scene geometry compared to a standard monocular image, thereby reducing the computing cost of processing and/or analyzing the image. For example, by identifying the overhanging projection in the sky projection, the human overhead cost and the computer processing requirements of identifying the overhanging structure within an image are reduced. Therefore, example embodiments improve the performance of the computer itself in identifying overhanging structures in images comprising at least a portion of a roadway.

In at least some example embodiments, a neural network or deep net is trained to analyze an image to identify any overhanging structures within the image, using image clusters obtained through an unsupervised machine learning technique. For example, an overhanging structure may be a tunnel, bridge, overpass, and/or the like that overhangs the roadway being traveled by a probe apparatus 20 and/or the corresponding vehicle 5. For example, the neural network, deep net, or other network may be trained to provide an overhanging structure detector that may operate on the apparatus 10 and/or one or more probe apparatuses 20. The overhanging structures identified by the overhanging structure detector and the corresponding overhanging structure information/data (e.g., geolocation of the overhanging structure, height of the overhanging structure, length of the overhanging structure, and/or the like) may be used to update one or more map tiles of a digital map. For example, the digital map may be configured to aid a probe apparatus 20 to autonomously drive a vehicle 5, provide information/data for use in various routing calculations and/or determinations, and/or the like.

In an example embodiment, the overhanging structure detector may be trained by analyzing a plurality of images. For example, a sky projection of an image may be generated. The sky projection may then be analyzed to identify a pattern corresponding to roadside objects, such as foliage, road signs, buildings, street lights, and/or the like. The roadside object pattern may define one or more roadside object directions. The one or more roadside object directions are generally substantially vertical. For example, FIGS. 5B and 6B provide a sky projection 70A, 70B of the images 60A, 60B shown in FIGS. 5A and 6A, respectively. The solid white lines 75A, 75B, 75C, 75D illustrate some of the directions defined by the roadside object patterns of the sky projections 70A, 70B. If an overhanging structure is present in the image, an overhanging feature will be present in the sky projection. For example, the overhanging structure 65 shown in the second image 60B gives rise to the overhanging feature 66 shown in the sky projection 70B. The overhanging feature 66 defines a feature direction 80. The feature direction 80 is substantially non-vertical and/or is substantially different from the roadside object directions 75C and 75D. Therefore, the overhanging structure detector may be trained without human oversight. In other words, the overhanging structure detector may be trained using a truly unsupervised machine learning technique.

The overhanging structure detector may be trained on a plurality of images. For example, the overhanging structure detector may be trained on ten images, a few dozen images, a hundred images, a few hundred images, a thousand images, a few thousand images, several thousand images, and/or the like as necessary to sufficiently train the overhanging structure detector. In an example embodiment, the overhanging structure detector may be trained until the neural network or deep net weights, parameters, and/or the like satisfy a convergence threshold requirement. For example, the neural network or deep net weights, parameters, and/or the like of the overhanging structure detector may reach a minimum convergence level. In an example embodiment, the overhanging structure detector may be used to identify overhanging structures in images captured by one or more probe apparatuses 20 in real time, near real time, or non-real time after the neural network or deep net weights, parameters, and/or the like of the overhanging structure detector satisfy the convergence threshold requirement. In an example embodiment, the overhanging structure detector may continue to be trained based on one or more images captured by one or more probe apparatuses 20 after the neural network or deep net weights, parameters, and/or the like of the overhanging structure detector satisfy the convergence threshold requirement.

Training the Overhanging Structure Detector

FIG. 3 provides a flowchart illustrating a process of training the overhanging structure detector. In an example embodiment, the apparatus 10 may train an overhanging structure detector. The neural network or deep net weights and/or parameters of the overhanging structure detector may then be provided to the overhanging structure detector 34 of the probe apparatus 20. If the overhanging structure detector continues to be trained (e.g., by apparatus 10 or in a distributed manner by one or more probe apparatuses 20), updated neural network or deep net weights and/or parameters of the overhanging structure detector may be provided to one or more probe apparatuses 20 at various intervals.

Starting at block 102, one or more images may be received and/or accessed by the neural network or deep net that is to be trained as the overhanging structure detector. For example, the apparatus 10 may receive and/or access one or more images. For example, the apparatus 10 may comprise means, such as processor 12, memory 14, communications interface 16, and/or the like, for receiving and/or accessing one or more images. In an example embodiment, at least one of the one or more images comprises at least one of a portion of a roadway, one or more objects on the side of the roadway, one or more vehicles or portions thereof on the roadway, and/or the like. At least one of the one or more images comprises an overhanging structure that overhangs at least a portion of the roadway.

At block 104, a sky projection from an image of the one or more images may be generated. For example, the apparatus 10 may generate a sky projection from an image of the one or more images. For example, the apparatus 10 may comprise means, such as the processor 12 and/or the like, for generating a sky projection from an image of the one or more images. In an example embodiment, the image is a perspective and/or front-facing view. In an example embodiment, the sky projection is a top-down view. For example, a sky projection may be generated from an image by using a homography to map pixels from the image to the sky projection. In an example embodiment, a bird's eye view projection or inverse perspective map projection may be used to generate the sky projection from the image. In an example embodiment, the sky region of the image may be used to generate the sky projection from the image. In an example embodiment, the ground region of the image may not be used to generate the sky projection from the image. In an example embodiment, the ground region may be a portion of the image that comprises the roadway and/or the ground. In an example embodiment, the ground region may be a lower portion of the image. In an example embodiment, the ground region may be the lower half of the image. In an example embodiment, pixels corresponding to the ground region of the image may not be processed when the sky projection is generated. In an example embodiment, the upper portion of the sky region of the image is warped using a homography to generate the sky projection. In an example embodiment, the sky region comprises the portions of the image that are not the ground region.

At block 106, a roadside object pattern is identified in the sky projection. For example, the apparatus 10 may identify a roadside object pattern in the sky projection. For example, the apparatus 10 may comprise means, such as the processor 12 and/or the like, for identifying a roadside object pattern in the sky projection. For example, the roadside object pattern 72A, 72B shown in the sky projections 70A, 70B, is shown in FIGS. 5A, 5B, 6A, and 6B. Generally, the sky projection exhibits regular structure. For example, the sky is exhibited as a blank area and the foliage and other roadside objects are represented by dominantly and/or substantially vertical patterns. Thus, the roadside object pattern may be identified based on dominantly and/or substantially vertical patterns present in the sky projection.

Continuing with FIG. 3, at block 108, one or more roadside object directions are identified. For example, the apparatus 10 may identify one or more roadside object directions. For example, the apparatus 10 may comprise means, such as the processor 12 and/or the like, configured for identifying one or more roadside object directions. For example, the roadside object pattern may define one or more roadside object directions. For example, the roadside object pattern 72A, 72B may define one or more roadside object directions 75A, 75B, 75C, 75D, as shown in FIGS. 5B and 6B. For example, as noted above, the roadside object pattern in the sky projection may be a dominantly and/or substantially vertical pattern. Thus, the roadside object direction(s) may be substantially vertical.

Continuing with FIG. 3, at block 110, it may be determined if any features within the sky projection define a feature direction that is substantially non-vertical and/or is substantially different from one or more of the roadside object directions. For example, the apparatus 10 determines if any features within the sky projection define a feature direction that is substantially non-vertical and/or is substantially different from one or more of the roadside object directions. For example, the apparatus 10 may comprise means, such as the processor 12 and/or the like, for determining if the any features within the sky projection define a feature direction that is substantially non-vertical and/or substantially different from one or more roadside object directions. For example, it may be determined if any features within the sky projection define a feature direction that is substantially different from each of the identified roadside object directions. For example, a feature direction may be considered substantially non-vertical if the feature direction satisfies a configurable and/or predefined angular threshold requirement. In an example embodiment, the configurable and/or predefined angular threshold requirement is determined based on the sky projection (e.g., the roadside object directions within the sky projection).

In an example embodiment, the configurable and/or predefined angular threshold requirement may be determined based on a plurality of roadside object directions identified in the sky projection. In an example embodiment, an average (e.g., mean, median, or mean) and a variation measure (e.g., standard deviation) of the roadside object directions identified in the sky projection may be determined. For example, the roadside object directions may be assumed to be drawn from a Gaussian distribution. A histogram of the roadside object directions may be generated and centered at zero (e.g., vertical) and a standard deviation or other variation measure may be determined by fitting a Gaussian curve to the histogram. For example, the apparatus 10 may determine an average and variation measure for the roadside object directions. It may then be determined if any feature defines a feature direction that is more than one variation measure (e.g., standard deviation) from the average roadside object direction. For example, in an example embodiment, one variation measure may define a configurable angular threshold that may be used to determine if a feature direction is substantially non-vertical. In another example embodiment, one and a half or two variations measures (e.g., one and a half or two standard deviations) may be used to define the configurable angular threshold.

At block 112, it is determined if any overhanging features were identified in the sky projection. In an example embodiment, an overhanging feature may be a feature that defines a feature direction that is substantially non-vertical and/or substantially different from one or more of the roadside object directions. For example, it may be determined that the feature direction 80 defined by feature 66 is approximately 24° from vertical, as illustrated in FIG. 6B. Therefore, it may be determined that the feature direction 80 defined by the feature 66 is substantially non-vertical. In another example, a comparison of feature direction 80 to roadside object directions 75C and 75D may result in a determination that the feature direction 80 is substantially different from roadside object direction 75C and/or 75D. Thus, the feature 66, which defines the feature direction 80, may be identified as an overhanging feature. For example, the apparatus 10 may determine if any overhanging features were identified in the sky projection. For example, the apparatus 10 may comprise means, such as the processor 12 and/or the like, for determining if any overhanging features were identified in the sky projection.

If, at block 112, it is determined that an overhanging feature was not identified in the sky projection, it is determined that no overhanging structures are present in the corresponding image, at block 114. For example, responsive to determining that no overhanging features were identified in the sky projection, the apparatus 10 may determine that the image corresponding to the sky projection does not comprise any overhanging structures. For example, the apparatus 10 may comprise means, such as the processor 12 and/or the like, for determining, responsive to determining that no overhanging features were identified in the sky projection, that the image corresponding to the sky projection does not comprise any overhanging structures. For example, no overhanging features are identified in the sky projection 70A shown in FIG. 5B. Therefore, it is determined that the corresponding image 60A, shown in FIG. 5A, does not comprise any overhanging structures.

Continuing with FIG. 3, at block 116, the image corresponding to the sky projection is provided and/or added to a no overhanging structure cluster. In an example embodiment, the no overhanging structure cluster comprises and/or consists of images that do not comprise an overhanging structure. For example, the apparatus 10 may provide and/or add the image corresponding to the sky projection to the no overhanging structure cluster. For example, the apparatus 10 may comprise means, such as the processor 12, memory 14, communication interface 16, and/or the like, for providing and/or adding the image corresponding to the sky projection to the no overhanging structure cluster. In an example embodiment, the no overhanging structure cluster may be stored in the Cloud and/or be accessible to the apparatus 10 and/or one or more probe apparatuses 20. In an example embodiment, the image itself and/or the sky projection may be added and/or provided to the cluster.

If, at block 112, it is determined that at least one overhanging feature was identified in the sky projection, it is determined that an overhanging structure is present in the corresponding image, at block 118. For example, responsive to determining that at least one overhanging feature was identified in the sky projection, the apparatus 10 may determine that the image corresponding to the sky projection comprises an overhanging structure. For example, the apparatus 10 may comprise means, such as the processor 12 and/or the like, for determining, responsive to determining that at least one overhanging feature was identified in the sky projection, that the image corresponding to the sky projection comprises an overhanging structure. For example, the overhanging feature 66 is identified in the sky projection 70B based on the feature direction 80, as shown in FIG. 6B. Therefore, it is determined that the corresponding image 60B, shown in FIG. 6A, comprises overhanging structure 65.

Continuing with FIG. 3, at block 120, the image corresponding to the sky projection is provided and/or added to an overhanging structure cluster. In an example embodiment, the overhanging structure cluster comprises and/or consists of images that comprise an overhanging structure. For example, the apparatus 10 may provide and/or add the image corresponding to the sky projection to the overhanging structure cluster. For example, the apparatus 10 may comprise means, such as the processor 12, memory 14, communication interface 16, and/or the like, for providing and/or adding the image corresponding to the sky projection to the overhanging structure cluster. In an example embodiment, the overhanging structure cluster may be stored in the Cloud and/or be accessible to the apparatus 10 and/or one or more probe apparatuses 20. In an example embodiment, the image itself and/or the sky projection may be added and/or provided to the cluster.

Blocks 104-120 may be iterated for one or more of the images received and/or accessed at block 102 to build an overhanging structure cluster and a no overhanging structure cluster that each comprise a plurality of images. In an example embodiment, the overhanging structure detector is implicitly represented via the overhanging structure and no overhanging structure clusters. In an example embodiment, one or more images of the overhanging structure cluster and/or the no overhanging structure cluster may then be provided to the neural network and/or deep net that is to be trained to be the overhanging structure detector. A neural network and/or deep net may be trained based on the one or more images of the overhanging structure cluster and/or the no overhanging structure cluster to analyze an image to (a) determine if an overhanging structure is present in the image and/or (b) identify one or more overhanging structures within the image. In an example embodiment, an image captured by an image capturing device 32 may be compared to one or more images of the overhanging structure cluster and/or the no overhanging structure cluster to determine if an overhanging structure is present in the image captured by the image capturing device 32. In an example embodiment, a network need not be trained to use the overhanging structure cluster and no overhanging structure cluster to provide an overhanging structure detector.

As detailed above, the overhanging structure cluster and the no overhanging structure cluster may be built by the apparatus 10 without human oversight. Thus, the overhanging structure detector may be built and/or trained using an unsupervised machine learning technique. These clusters each comprise a plurality of images that may be used to train an overhanging structure detector without the intensive time, labor, and capital investment required to manually annotate images for training an overhanging structure detector. In an example embodiment, the clusters may be used to directly identify overhanging structures in images without the use of a trained network.

In an example embodiment, the overhanging structure cluster may be further divided into overhanging structure type sub-clusters. For example, the overhanging structure cluster may be divided into a tunnel sub-cluster, highway overpass sub-cluster, and/or other sub-clusters corresponding to other types of overhanging structures. For example, the tunnel sub-cluster may comprise and/or consist of one or more images comprising at least one overhanging structure, wherein at least one of the overhanging structures is a tunnel-type overhanging structure. In another example, the overpass sub-cluster may comprise and/or consist of one or more images comprising at least one overhanging structure, wherein at least one of the overhanging structures is an overpass-type overhanging structure. Other sub-clusters of the overhanging structure cluster may be defined similarly, in various embodiments. Thus, in an example embodiment, one or more sub-clusters of the overhanging structure cluster may be defined.

In an example embodiment, the determination of the type of overhanging structure present in an image may be made based on overhanging structure information/data extracted and/or determined from the image. For example, the height of the overhanging structure over the roadway surface, the length of the overhanging structure along the roadway surface, and/or the like may be extracted and/or determined from the image. For example, the apparatus 10 may extract and/or determine overhanging structure information/data from the image. For example, the apparatus 10 may comprise means, such as the processor 12 and/or the like, for determining and/or extracting overhanging structure information/data from the image. The extraction and/or determination of overhanging structure information/data from an image is described in more detail below.

The determination of the type of overhanging structure present in an image may be determined and/or identified based on the corresponding overhanging structure information/data. For example, an overhanging structure having a length that satisfies a predetermined and/or configurable tunnel length threshold requirement may be determined to be a tunnel-type overhanging structure. In an example embodiment, an overhanging structure having a length that does not satisfy the predetermined and/or configurable tunnel length threshold requirement may be determined to be an overpass-type overhanging structure, and/or the like. Thus, in an example embodiment, the overhanging structure information/data may be used to determine and/or identify an overhanging structure type for the overhanging structure identified in the image. For example, the apparatus 10 may determine and/or identify an overpass structure type for the overpass identified in an image based on overhanging structure information/data extracted and/or determined from the image. For example, the apparatus 10 may comprise means, such as the processor 12 and/or the like, for determining and/or identifying an overpass structure type for the overpass identified in an image based on overhanging structure information/data extracted and/or determined from the image. In an example embodiment, the determination of an overhanging structure type may be further based on link information/data from a digital map. For example, a highway overpass overhanging structure type may be defined wherein a highway overpass type overhanging structure is an overhanging structure wherein the roadway in the image is a highway (e.g., freeway, interstate, state highway, county highway, and/or the like, as determined based on link information/data corresponding to the roadway) and the overhanging structure does not satisfy a predetermined and/or configurable tunnel length threshold requirement. In an example embodiment, the feature space for determining sub-clusters may include a combination of color and/or texture features.

At block 122, one or more images of the overhanging structure cluster may be assigned to one or more overhanging structure type sub-clusters. For example, the apparatus 10 may assign one or more images of the overhanging structure cluster to one or more overhanging structure type sub-clusters. For example, the apparatus 10 may comprise means, such as processor 12 and/or the like, for assigning each of one or more images to an overhanging structure type sub-cluster. The overhanging structure type sub-cluster information/data identifying which images are assigned to which overhanging structure type sub-cluster may be stored in association with the overhanging structure cluster. For example, the overhanging structure type sub-cluster information/data identifying which images are assigned to which overhanging structure type sub-cluster may be stored in the Cloud and/or be accessible to the apparatus 10 and/or one or more probe apparatuses 20.

Thus, in an example embodiment the online unsupervised machine learning technique may be used to train and/or build the overhanging structure detector to (a) determine if an overhanging structure is present in an image, (b) identify one or more overhanging structures within an image, and/or (c) determine and/or identify the overhanging structure type corresponding to an overhanging structure identified in the image.

Using the Overhanging Structure Detector to Update a Map

In an example embodiment, once the overhanging structure detector is trained (e.g., using an unsupervised machine learning technique similar to that described above), the overhanging structure detector may be used to identify overhanging structures within images such that map information/data may be updated based thereon. FIG. 4 provides a flowchart of processes and/or procedures that may be completed by an apparatus 10 and/or a probe apparatus 20 to update a map using the overhanging structure detector. Starting at block 202, the overhanging structure detector is trained. For example, the apparatus 10 may train the overhanging structure detector. For example, the apparatus 10 may comprise means, such as the processor 12, memory 14, and/or the like for training the overhanging structure detector. In an example embodiment, the overhanging structure detector is trained using an unsupervised machine learning technique similar to that described above. In an example embodiment, a neural network and/or deep net may be trained using the overhanging structure cluster and/or no overhanging structure cluster to determine network weights and/or parameters, which may then be provided to the probe apparatus 20 (e.g., for storage in memory 24) and/or stored in memory 14 and/or another memory accessible to the processor 12. In another example embodiment, the probe apparatus 20 and/or apparatus 10 may be provided with access to one or more images assigned to the overhanging structure cluster and/or no overhanging structure cluster for comparing against a captured image (e.g., captured by the image capturing device 32) for directly determining if an overhanging structure is present in the captured image.

At block 204, at some time after the overhanging structure detector is trained. An image may be captured. For example, the probe apparatus 20 may capture an image. For example, the probe apparatus 20 may comprise means, such as the image capturing device 32, processor 12, and/or the like, for capturing an image. In an example embodiment, the probe apparatus 20 may provide the image to the apparatus 10 for processing. For example, the probe apparatus 20 may provide (e.g., transmit) the image (e.g., using the communication interface 26) to the apparatus 10. For example, the apparatus 10 may receive an image captured by a probe apparatus 20. For example, the apparatus 10 may comprise means, such as the communication interface 16, processor 12, memory 14, and/or the like, for receiving an image captured by a probe apparatus 20. In an example embodiment, the image may comprise at least a portion of a roadway being traveled along by the probe apparatus 20 and/or the corresponding vehicle 5. In an example embodiment, the image may comprise at least one of one or more roadside objects (e.g., foliage, street signs, street lights, telephone poles, buildings, and/or the like), at least a portion of one or more overhanging structures, a portion of the sky located above the roadway, at least portions of one or more vehicles, and/or the like.

At block 206, the image is provided to the overhanging structure detector. For example, the apparatus 10 may provide the image to the overhanging structure detector operating on the apparatus 10 and/or in communication therewith. In another example, the probe apparatus 20 may provide the image to the overhanging structure detector 34 operating on the probe apparatus 20 and/or in communication therewith. For example, the apparatus 10 may comprise means, such as the processor 12 and/or the like, for providing the image to the overhanging structure detector. For example, the probe apparatus 20 may comprise means, such as the processor 22 and/or the like, for providing the image to the overhanging structure detector 34. As noted above, the overhanging structure detector is configured to analyze an image to determine if an overhanging structure is present in the image and, if an overhanging structure is present in the image identify the overhanging structure. For example, the overhanging structure detector may be configured to detect one or more overhanging structures within an image. In an example embodiment, the overhanging structure detector may be further configured to determine and/or extract overhanging structure information/data from the image. In an example embodiment, the overhanging structure detector may be further configured to determine an overhanging structure type for the overhanging structure in the image based on the overhanging structure information/data and/or link information/data for the roadway present in the image.

At block 208, it is determined if at least one overhanging structure was detected in the image. For example, the apparatus 10 and/or the probe apparatus 20, as appropriate, may determine if an overhanging structure was detected in the image. For example, the apparatus 10 may comprise means, such as the processor 12 and/or the like, for determining if the overhanging structure detector detected any overhanging structures within the image. For example, the probe apparatus 20 may comprise means, such as the processor 22 and/or the like, for determining if the overhanging structure detector detected an overhanging structure within the image.

If it is determined, at block 208, that no overhanging structures were detected in the image, the process returns to block 204 to capture and/or receive another image. If it is determined, at block 208, that one or more overhanging structures were detected in the image, the process continues to block 210. At block 210, overhanging structure information/data is received and/or determined. For example, in an example embodiment, the overhanging structure detector may determine and/or extract overhanging structure information/data from the image responsive to identifying an overhanging structure within the image. In another example embodiment, the overhanging structure detector may identify the overhanging structure and the overhanging structure information/data may be determined and/or extracted from the image by one or more elements of the apparatus 10 and/or probe apparatus 20 that are distinct from the overhanging structure detector (e.g., 34). For example, the apparatus 10 and/or the probe apparatus 20, as appropriate, may receive or determine and/or extract overhanging structure data from the image. For example, the apparatus 10 may comprise means, such as the processor 12 and/or the like, for receiving or determining and/or extracting overhanging structure data from the image. For example, the probe apparatus 20 may comprise means, such as the processor 22 and/or the like, for receiving or determining and/or extracting overhanging structure data from the image.

In an example embodiment, the overhanging structure information/data may be determined and/or extracted from the image based on knowledge of the height of the image capture device 32 above the roadway surface when the image was a captured. For example, the image may be associated with image metadata. The image metadata may comprise information/data identifying the height above the roadway surface of the image capture device 32 that captured the image, a geolocation at which the image was captured (e.g., as determined by the location sensor 30 and/or the like), and/or other information/data associated with the image and/or the capture of the image. For example, the probe apparatus 20 may store (e.g., in memory 24) information/data corresponding to the image capturing device 32, such as the height above the roadway surface of the image capturing device 32. At least a portion of the information/data corresponding to the image capturing device 32 may be associated with the image captured thereby as image metadata. The height of the overhanging structure above the roadway surface may then be determined based on the known height of the image capture device 32 above the roadway surface.

In another example embodiment, a vehicle detector may be configured to identify one or more vehicles in the image. The vehicle detector may be configured to identify a type of vehicle for at least one vehicle identified in the image. A canonical vehicle height and/or a canonical vehicle height for the type of vehicle identified in the image may be applied to determine the distance between the image capture device 32 and the vehicle identified in the image at the moment the image was captured by the image capture device 32. Once the distance between the image capture device 32 and the vehicle identified in the image is known, that distance can be applied to determine the height above the roadway surface of the overhanging structure identified in the image.

In an example embodiment, odometry techniques may be used to determine the length of the overhanging structure along the roadway. In particular, odometry techniques may be used to determine the length of the overhanging structure along the roadway if the overhanging structure is identified as a tunnel-type overhanging structure. In an another example embodiment, one or more odometer readings of the vehicle 5 or location determinations determined by the location sensor 30 (e.g., corresponding to when the overhanging structure is first viewed as being overhead in an image captured by the image capturing device 32 and when the overhanging structure is last viewed as being overhead in an image captured by the image capturing device 32) may be used to determine the length of the overhanging structure along the roadway.

In an example embodiment, the overhanging structure information/data may comprise a geolocation of the overhanging structure. For example, the image metadata may comprise a geolocation of the probe apparatus 20 and/or the corresponding vehicle 5 when the image was captured. For example, the image may be tagged with a geolocation. For example, the location sensor 30 may determine a geolocation of the probe apparatus 20 and/or the corresponding vehicle 5 at approximately the moment when the image is captured. In an example embodiment, the distance between the image capture device 32 and/or the corresponding vehicle 5 and the overhanging structure along the roadway surface may be determined based on the image (e.g., using a technique similar to the above to determine the height above the roadway surface of the overhanging structure) and a geolocation for the overhanging structure may be determined based on (a) the geolocation of the probe apparatus 20 and/or the corresponding vehicle 5 and/or (b) the distance between the image capture device 32 and/or the corresponding vehicle 5 and the overhanging structure along the roadway surface.

At block 212, if the probe apparatus 20 provided the image to the overhanging structure detector 34 and/or received, determined, and/or extracted the overhanging structure information/data, the probe apparatus 20 may provide the overhanging structure information/data (or at least a portion thereof) to the apparatus 10. For example, the probe apparatus 20 may provide (e.g., transmit) at least a portion of the overhanging structure information/data. For example, the probe apparatus 20 may comprise means, such as the processor 22, communication interface 26, and/or the like, for providing (e.g., transmitting) at least a portion of the overhanging structure information/data. The apparatus 10 may then receive the provided overhanging structure information/data. For example, the apparatus 10 may comprise means, such as the processor 12, communication interface 16, and/or the like, for receiving the provided overhanging structure information/data. In an example embodiment, the apparatus 10 may store at least a portion of the received overhanging structure information/data in memory 14, and/or another memory accessible to the apparatus 10.

At block 214, map information/data may be updated based at least in part on the received and/or determined/extracted overhanging structure information/data. For example, the apparatus 10 my update map information/data based at least in part on the received and/or determined/extracted overhanging structure information/data. For example, the apparatus 10 may comprise means, such as the processor 12 and/or the like, for updating map information/data based at least in part on the received and/or determined/extracted overhanging structure information/data. For example, a map tile of a digital map may be updated based on one or more instances of overhanging structure information/data corresponding to the overhanging structure. For example, the map information/data may be updated based on the geolocation of the overhanging structure as inferred by the overhanging structure information/data, a geolocation tag embedded in the image, and/or the like. In an example embodiment, two or more instances of overhanging structure information/data may be determined to correspond to the same overhanging structure based at least in part on the location of the overhanging structure, overhanging structure type, an identifier associated with the overhanging structure, and/or the like.

After updating the map information/data the updated map information/data may be provided to one or more probe apparatuses 20, stored for later use, and/or the like. For example, the apparatus 10 may provide the updated map information/data to one or more probe apparatus 20, store the updated map information/data, and/or the like. For example, the apparatus 10 may comprise means, such as the processor 12, memory 14, communication interface 16, and/or the like for providing the updated map information/data to one or more probe apparatuses 20, storing the updated map information/data, and/or the like. In an example embodiment, a probe apparatus 20 that receives the updated map information/data may then perform one or more location determinations, route determinations, and/or the like based at least in part on the updated map information/data.

III. Example Apparatus

The probe apparatus 20 and/or apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts a remote apparatus 10 and FIG. 2B depicts a vehicle apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. In an example embodiment, the memory device 14 may be non-transitory and be configured to at least store computer-executable instructions and/or the like. In an example embodiment, the apparatus 10 may further comprise an overhanging structure detector. In an example embodiment, the apparatus 10 may train and/or build the overhanging structure detector through unsupervised online learning technique that clusters images based on the presence of an overhanging structure being detected in the image based on an analysis of the roadside object directions identified within a sky projection of the image. For example, the overhanging structure detector may be a network (e.g., a deep neural network, and/or the like) that is to be or has been trained using a semi-supervised machine learning technique to identify an overhanging structure in an image. For example, the overhanging structure detector may be a trained deep net and/or neural network. For example, the overhanging structure detector may be trained to analyze an image captured by an image capturing device 32 onboard a vehicle 5 to determine if an overhanging structure is present in the image. In example embodiments, the overhanging structure detector may operate on a central processing unit (CPU) or a graphics processing unit (GPU) of the apparatus 10.

Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GNSS sensor, GPS sensor; IMU sensors, and/or the like), one or more image capturing devices 32 (e.g., camera(s); 2D and/or 3D LiDAR(s) sensors; long, medium, and/or short range RADAR sensors; ultrasonic sensors; electromagnetic sensors; (near-) IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein. In an example embodiment, the probe apparatus 20 may further comprise an overhanging structure detector 34. For example, the overhanging structure detector 34 may be a network (e.g., a deep neural network, and/or the like) that has been trained using a semi-supervised machine learning technique to identify an overhanging structure in an image. For example, the overhanging structure detector may be a trained deep net and/or neural network. For example, the overhanging structure detector 34 may be trained to analyze an image captured by the image capturing device 32 to determine if an overhanging structure is present in the image. In an example embodiment, the analysis of the image may be implicitly performed by a trained network. In an example embodiment, the analysis may be directly performed by comparison of the image to one or more images and/or sky projections assigned to the overhanging structure and/or no overhanging structure clusters. In example embodiments, the overhanging structure detector 34 may operate on a central processing unit (CPU) or a graphics processing unit (GPU) of the probe apparatus 20. For example, network weights and/or parameters for the overhanging structure detector 34 may be provided (e.g., transmitted) to the probe apparatus 20 by the apparatus 10.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 and/or probe apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The apparatus 10 and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 and/or probe apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 may be configured to execute computer-executable instructions provided by and/or referred to by a data record. In an example embodiment, the apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the apparatus 10 may update the geographic database, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 or a probe apparatus 20 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an image captured by an image capturing device in communication with a probe apparatus on board a vehicle, wherein the image comprises at least a portion of a roadway;
   generating a sky projection based on at least a portion of the image;
   determining whether the sky projection comprises a feature that defines a feature direction that is substantially non-vertical; and
   responsive to determining that the sky projection does comprise a feature that defines a feature direction that is substantially non-vertical, determining that the image comprises an overhanging structure.

2. A method according to claim 1, further comprising:
   responsive to determining that the sky projection does comprise a feature that defines a feature direction that is substantially non-vertical, adding the image to a first cluster, the first cluster consisting of images comprising overhanging structures; or
   responsive to determining that the sky projection does not comprise a feature that defines a feature direction that is substantially non-vertical, adding the image to a second cluster, the second cluster consisting of images not comprising overhanging structures,
   wherein the first cluster and second cluster represent an unsupervised overhanging structure detector network.

3. A method according to claim 2, further comprising training a network to act as an overhanging structure detector using the first and second clusters.

4. A method according to claim 1, further comprising:
   using the overhanging structure detector to identify an overhanging structure in one or more images captured by one or more probe apparatuses each onboard a vehicle, each of the one or more images tagged with a geolocation determined by a location sensor in communication with the corresponding probe apparatus;
   analyzing the image to determine overhanging structure information corresponding to the identified overhanging structure; and
   updating map information based on at least one of (a) the geolocation, (b) at least a portion of the overhanging structure information, or (c) both.

5. A method according to claim 1, wherein the feature direction is substantially non-vertical when the feature direction satisfies a configurable angular threshold requirement.

6. A method according to claim 1, wherein the feature direction is substantially non-vertical when the feature direction substantially differs from one or more roadside object directions defined by a roadside object pattern within the sky projection.

7. A method according to claim 1, further comprising analyzing the image to determine overhanging structure information.

8. A method according to claim 7, wherein the overhanging structure information comprises at least one of the height of the overhanging structure, the length of the overhanging structure, or both.

9. A method according to claim 1, wherein generating the sky projection from the image comprises using a homography to map pixels of the image to a top-down view, the top-down view comprising the sky projection, wherein the pixels of at least a bottom portion of the image are not mapped to the top-down view, the bottom portion comprising at least one of a portion of a roadway, a portion of a ground, a portion of a vehicle, or a combination thereof.

10. An apparatus comprising at least one processor and at least one memory storing computer program code, with the at least one memory and the computer program code configured to, with the processor, cause the apparatus to at least:
    receive an image captured by an image capturing device in communication with a probe apparatus on board a vehicle, wherein the image comprises at least a portion of a roadway;
    generate a sky projection based on at least a portion of the image;
    determine whether the sky projection comprises a feature that defines a feature direction that is substantially non-vertical; and
    responsive to determining that the sky projection does comprise a feature that defines a feature direction that is substantially non-vertical, determine that the image comprises an overhanging structure.

11. An apparatus according to claim 10, wherein the at least one memory and the computer program code are configured to, with the processor, to cause the apparatus to at least:
    responsive to determining that the sky projection does comprise a feature that defines a feature direction that is substantially non-vertical, add the image to a first cluster, the first cluster consisting of images comprising overhanging structures; or
    responsive to determining that the sky projection does not comprise a feature that defines a feature direction that is substantially non-vertical, add the image to a second cluster, the second cluster consisting of images not comprising overhanging structures,
    wherein the first cluster and second cluster represent an unsupervised overhanging structure detector network.

12. An apparatus according to claim 11, wherein the at least one memory and the computer program code are configured to, with the processor, to cause the apparatus to at least train a network to act as an overhanging structure detector using the first and second clusters.

13. An apparatus according to claim 10, wherein the at least one memory and the computer program code are configured to, with the processor, to cause the apparatus to at least:
    use the overhanging structure detector to identify an overhanging structure in one or more images captured by one or more probe apparatuses each onboard a vehicle, each of the one or more images tagged with a geolocation determined by a location sensor in communication with the corresponding probe apparatus;
    analyze the image to determine overhanging structure information corresponding to the identified overhanging structure; and
    update map information based on at least one of (a) the geolocation, (b) at least a portion of the overhanging structure information, or (c) both.

14. An apparatus according to claim 10, wherein the feature direction is substantially non-vertical when the feature direction satisfies a configurable angular threshold requirement.

15. An apparatus according to claim 10, wherein the feature direction is substantially non-vertical when the feature direction substantially differs from one or more roadside object directions defined by a roadside object pattern within the sky projection.

16. An apparatus according to claim 10, wherein the at least one memory and the computer program code are configured to, with the processor, to cause the apparatus to at least analyze the image to determine overhanging structure information.

17. An apparatus according to claim 16, wherein the overhanging structure information comprises at least one of the height of the overhanging structure, the length of the overhanging structure, or both.

18. An apparatus according to claim 10, wherein to generate the sky projection from the image, the at least one memory and the computer program code are configured, with the processor, to cause the apparatus to at least use a homography to map pixels of the image to a top-down view, the top-down view comprising the sky projection, wherein the pixels of at least a bottom portion of the image are not mapped to the top-down view, the bottom portion comprising at least one of a portion of a roadway, a portion of a ground, a portion of a vehicle, or a combination thereof.

19. A computer program product comprising at least one non-transitory computer-readable storage medium having computer-executable program code instructions stored therein with the computer-executable program code instructions comprising program code instructions configured to:

receive an image captured by an image capturing device in communication with a probe apparatus on board a vehicle, wherein the image comprises at least a portion of a roadway;

generate a sky projection based on at least a portion of the image;

determine whether the sky projection comprises a feature that defines a feature direction that is substantially non-vertical; and responsive to determining that the sky projection does comprise a feature that defines a feature direction that is substantially non-vertical, determine that the image comprises an overhanging structure.

20. A computer program product according to claim 19, wherein the computer-executable program code instructions further comprise program code instructions configured to:

responsive to determining that the sky projection does comprise a feature that defines a feature direction that is substantially non-vertical, add the image to a first cluster, the first cluster consisting of images comprising overhanging structures; or responsive to determining that the sky projection does not comprise a feature that defines a feature direction that is substantially non-vertical, add the image to a second cluster, the second cluster consisting of images not comprising overhanging structures, wherein the first cluster and second cluster represent an unsupervised overhanging structure detector network.

* * * * *